United States Patent Office 3,400,050
Patented Sept. 3, 1968

---

3,400,050
PREPARATION AND ISOLATION OF TETRA-CYCLINES WITH THE AID OF TETRACYCLINE COMPLEXES
Joao Villax, Lisbon, Portugal, assignor to International Rectifier Corporation, Los Angeles, Calif., a corporation of California
No Drawing. Continuation-in-part of application Ser. No. 353,235, Mar. 19, 1964. This application Oct. 17, 1966, Ser. No. 586,940
Claims priority, application Portugal, Mar. 28, 1963, 40,718
7 Claims. (Cl. 195—80)

ABSTRACT OF THE DISCLOSURE

The present invention provides an improvement in the process of preparation and isolation of various microbiologically produced tetracyclines. In a process for the production of a compound selected from the group chlortetracycline, tetracycline, oxytetracycline and demethylchlortetracycline by aerobic fermentation of an aqueous fermentation medium, containing alkaline earth metal ions, with a tetracycline-producing microorganism of the genus Streptomyces, the improvement is provided wherein a small amount of N,N'-dibenzylideneethylenediamine is added to the medium to form an alkaline earth metal complex of the said tetracycline. Subsequently the said complex is isolated and the free tetracycline base is isolated therefrom.

---

SPECIFICATION

The present application is a continuation-in-part of copending application, Ser. No. 353,235, filed Mar. 19, 1964, now U.S. Patent No. 3,280,188.

The present invention relates to the preparation and isolation of various microbiologically produced tetracyclines such as tetracycline, oxytetracycline, chlortetracycline and demethylchlortetracycline, by means of alkaline earth metal dibenzylideneethylenediamine complexes of the respective tetracyclines.

The aforesaid complexes are formed by adding N,N'-dibenzylideneethylenediamine, hereinafter designated by "Δ-DBED," of the formula

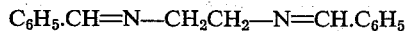

$$C_6H_5.CH{=}N{-}CH_2CH_2{-}N{=}CH.C_6H_5$$

to the culture medium during fermentation or to the already fermented and respective tetracycline-containing broth, in the presence of alkaline earth metal ions, and are precipitated after separation from the mycelium at a pH between 8 and 9.5. The respective tetracycline is then liberated from the complex thus obtained, by adjusting the pH to its isoelectric point by acidification.

The present invention presents important industrial advantages: isolation accomplished in few steps; organic solvents not used; use of cheap isolation products; and high yield.

When Δ-DBED is added to the culture medium during fermentation, the fermentation yield, i.e., the antibiotic activity attained by the medium during fermentation, increases by 5 to 20% approximately, according to the conditions and the strain used, in comparison to parallel fermentations run without addition of Δ-DBED.

The quantity of Δ-DBED added to the broth is, at least, half a mole per mole of antibiotic, in respect of tetracycline, oxytetracycline and chlortetracycline. In the case of demethylchlortetracycline, it is preferable to use one mole and a half of Δ-DBED per mole of the antibiotic.

In order to obtain the highest yields, there are added during fermentation 10 to 1000 milligrams of Δ-DBED per liter of broth in various portions, and to the acidified and filtered broth there is added, at pH 5, the quantity of Δ-DBED necessary to obtain the above-mentioned proportions, calculated on the quantity of antibiotic formed during fermentation. The embodiment of the present process also includes the isolation of the tetracyclines by means of the Δ-DBED complexes, in the event of the same being carried out exclusively in the phase of the already fermented broth.

Any tetracycline-producing microorganism, such as Streptomyces alboflavus, Streptomyces aureofaciens, Streptomyces flavus, Streptomyces flaveolus, Streptomyces rimosus, Streptomyces viridifaciens, Streptomyces, sayamaensis, Streptomyces psammoticus, Streptomyces lusitanus, Streptomyces varsoviensis, including its mutants, can be used in the present process.

The Δ-DBED is added to the culture medium in various portions under sterile conditions. When the additions are made at 0, 36, 96 and 120 hours of fermentation, satisfactory results are obtained. The fermented broth is then acidified at a pH between 0.5 and 1.8 with an acid, such as sulphuric and oxalic acid, although other acids can also be used. The broth is then filtered and the pH adjusted to 5 with ammonia, in the event it contains alkaline earth metal ions in quantity sufficient to form the Δ-DBED complex, and if not the pH is adjusted with an alkaline earth metal hydroxide. There is then added the quantity of Δ-DBED necessary to obtain a total quantity of, at least, half a mole per mole of the tetracycline, oxytetracycline or chlortetracycline present, and at least one mole and a half per mole of demethylchlortetracycline. After stirring, the addition of the base is continued until pH 8 to 9.5. The Δ-DBED complex is then precipitated.

Analysis confirms that the complexes formed correspond to the following formulas:

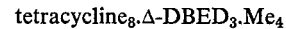

tetracycline$_8$.Δ-DBED$_3$.Me$_4$

oxytetracycline$_8$.Δ-DBED$_3$.Me$_4$.16H$_2$O

chlortetracycline$_8$.Δ-DBED$_3$.Me$_6$

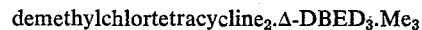

demethylchlortetracycline$_2$.Δ-DBED$_3$.Me$_3$ where Me is an alkaline earth metal. In addition to the above-mentioned complexes, other less important complexes having a different composition can be prepared and formed.

The complex formed is then filtered off, washed with water and suspended, when still wet, in water. By adjusting the pH of the suspension to the isoelectric point of the respective tetracycline with an acid such as hydrochloric, sulphuric or oxalic acid, the corresponding tetracycline base can be prepared in pure state. By recrystallizing the complexes, using a suitable solvent, such as dimethylformamide, by addition of water, the complexes can be obtained in pure form.

In view of the fact that the broths used usually contain calcium salts in a great amount and the broth acidified by dilute sulphuric acid also contains calcium ions in excess for the precipitation of the complex, the addition of a sequestering agent, such as ethylenediamine tetraacetate, before the precipitation of the complex, makes it possible to obtain higher yields. Also the addition of an antioxidant to the acidified broth makes it possible to obtain a product of a higher degree of purity. As antioxidant, ammonium formaldehyde sulfoxylate is preferred but any other smooth antioxidant can be used.

In each case, the base obtained after precipitation at the pH of the isoelectric point meets the degree of purity required by the various pharmacopeias and can be used for medicinal purposes or can be transformed into the corresponding acid salts by known methods.

The other fermentation conditions are generally known and the following examples give a full illustration of how same is performed.

The various Δ-DBED complexes present in pure state the following characteristics:

Δ-DBED$_3$.Ca$_4$.tetracycline$_8$: decomposition over 200° C.; specific rotation: $[\alpha]_D = -225°$ (c.=1 in N/10 HCl). Ultraviolet spectrum:

λ max. 222 ($E^{1\%}_{1cm.}$ 292); λ max. 255/56 ($E^{1\%}_{1cm.}$ 403); λ max. 355/357 ($1^\%_{cm.}$ 261)

Infrared spectrum having the following maxima in Nujol: 2.97μ, 6.17μ (shoulder), 6.30μ, 6.72μ, 6.93μ, 7.14μ, 7.57μ, 7.83μ (shoulder), 8.56μ, 9.1μ, 9.48μ, 9.66μ, 10.31μ, 10.55μ, 11.76μ, 12.18μ.

Δ-DBED$_3$.Ca$_4$oxytetracycline$_8$: decomposition at 170°–172° C.; specific rotation: $[\alpha]_D = -180°$ (c.=1 in N/10 HCl). Ultraviolet spectrum:

λ max. 254 ($E^{1\%}_{1cm.}$ 400); λ max. 353 ($E^{1\%}_{1cm.}$ 231)

Infrared spectrum having the following maxima in Nujol: 3.01μ, 6.12μ (shoulder), 6.22μ (shoulder), 6.32μ, 6.71μ, 6.93μ, 7.17μ, 7.66μ, 7.9μ, 8.07μ, 8.22μ, 8.59μ, 8.94μ, 9.21μ, 9.35μ, 9.52μ, 9.72μ, 9.92μ, 10.35μ, 10.67μ, 11.66μ, 11.95μ, 12.35μ.

Δ-DBED$_3$.Ca$_6$.chlortetracycline$_8$: decomposition beginning at 200° C.; specific rotation: $[\alpha]_D = -230°$ (c.=1 in N/10 HCl). Uutraviolet spectrum:

λ max. 232 ($E^{1\%}_{1cm.}$ 375); λ max 255 ($E^{1\%}_{1cm.}$ 376); λ max. 370 ($E^{1\%}_{1cm.}$ 178)

Infrared spectrum having the following maxima in Nujol: 2.95μ, 6.12μ (shoulder), 6.26μ, 6.35μ (shoulder), 6.80μ (shoulder), 6.95μ, 7.15μ (shoulder), 7.62, 8.17μ (shoulder), 8.30μ, 8.60μ, 8.92μ, 9.57μ, 10.28μ, 12.15μ, 12.37μ.

Δ-DBED$_3$.Ca$_3$-demethylchloreteracycline$_2$: decomposition over 200° C.; specific rotation: $[\alpha]_D = -180°$ (c.=1 in N/10 HCl). Ultraviolet spectrum:

λ max. 251 ($E^{1\%}_{1cm.}$ 503); λ max. 366/368 ($E^{1\%}_{1cm.}$ 171)

Infrared spectrum having the following maxima in Nujol: 3.0μ, 6.13μ, 6.29μ, 6.84μ (shoulder), 6.93μ, 7.22μ, 7.41μ, 7.76μ, 8.07μ, 8.33μ, 8.61μ, 8.86μ, 9.15μ, 9.66μ, 10.0μ, 10.32μ, 11.0μ, 11.45μ, 12.19μ, 13.32μ. Similarly complexes of the same composition may be prepared containing barium, strontium or magnesium instead of calcium, although the preferred complexes are those of calcium.

The following non-limitative examples of presently preferred embodiments serve to illustrate the present invention.

Example 1

All media were prepared with tap water.

A fermenter having a useful capacity of 6000 liters, containing a medium of the following composition:

| | Grams |
|---|---|
| Corn steep liquor | 28 |
| Calcium carbonate | 14 |
| Starch | 38 |
| (NH$_4$)$_2$SO$_4$ | 5.7 |
| NH$_4$Cl | 1.5 |
| MnSO$_4$.4H$_2$O | 0.05 |
| CoCl$_2$.6H$_2$O | 0.002 |
| ZnSO$_4$ | 0.05 |
| Peanut meal | 25 |
| Lard oil, per liter of tap water | 35 |

(pH 6.7–6.8 after sterilization)

is inoculated with 150 liters of a pre-culture of *Streptomyces viridifaciens*. There is added to the medium 1 gram/liter of Δ-DBED divided into four equal portions at 0, 36, 72 and 98 hours of fermentation. The fermentation is performed at 28° C. with aeration of 2 liter/liter per minute. After 150 hours, 8.6 grams per liter of tetracycline are obtained. The medium is then acidified to pH 1.5 with 25% sulphuric acid, filtered with a drum filter and the cake is then extracted twice with water at pH 1.5. There is then added to the united filtrate 18 kilograms of ethylenediamine tetraacetate as sequestering agent and 12 kilograms of Δ-DBED; and then the pH is adjusted to 9.5 with 12% ammonia. After 3 hours of agitation, the precipitate which consists essentially of impure Δ-DBED-tetracycline calcium complex having the formula Δ-DBED$_3$.Ca$_4$.tetracycline$_8$, is filtered off. The wet precipitate is then suspended in water, acidified with a 10% aqueous solution of oxalic acid to pH 1.5 under agitation. Then the solution is filtered and the pH is adjusted to 5.8 with a 10% aqueous sodium hydroxide solution. The tetracycline base precipitates. The precipitate is filtered and dried under reduced pressure at 65° C. Effective yield 88% calculated in activity.

Example 2

1 liter of sterilized medium having the composition:

| | | |
|---|---|---|
| Corn steep liquor 50% | grams | 10 |
| Sugar | do | 10 |
| CaCO$_3$ | do | 1 |
| (NH$_4$)$_2$HPO$_4$ | do | 2 |
| KH$_2$PO$_4$ | do | 2 |
| MgSO$_4$.7H$_2$O | do | 0.25 |
| Water | milliliters | 1000 | was inoculated with 1 milliliter of spore suspensions of *Streptomyces alboflavus* mutant M–108–OX (CBS) and incubated at 25° C. in a rotary shaker for 36 hours. Afterwards, a fermenter containing a sterilized medium of the formula:

| | | |
|---|---|---|
| Tap water | liters | 120 |
| Starch | kilograms | 6 |
| Corn steep liquor (50%) | do | 2.7 |
| CaCO$_3$ | do | 0.72 |
| (NH$_4$)$_2$SO$_4$ | do | 0.2 |
| CoCl$_2$ | gram | 0.180 |
| CuSO$_4$.5H$_2$O | do | 0.6 |
| ZnSO$_4$.7H$_2$O | do | 6 |
| FeSO$_4$ | do | 0.180 |
| Sunflower oil | kilogram | 0.2 | was inoculated with the above-mentioned pre-culture of 36 hours. 400 milligrams per liter of Δ-DBED divided into four fractions are added at 0, 36, 72 and 96 hours of fermentation.

Submerged fermentation was then performed at 26° C. under stirring and sterile aeration. Fermentation was stopped after 150 hours, showing a final concentration of oxytetracycline of 7.6 grams per liter.

The fermented broth is acidified with sulphuric acid (25%) until pH 1.5, filtered and the mycelium washed with water. The joint filtrate has a volume of 240 liters. There is then added 2 grams per liter of ethylenediamine tetraacetate (sequestering agent). The pH is then adjusted to 6 with ammonium hydroxide (12%), 140 grams of Δ-DBED added and the pH raised to 9.5 with ammonium hydroxide (12%). After stirring for 3 hours, the formed precipitate is filtered and washed until the pH of the washing waters reaches pH 7. The wet precipitate is suspended in water and acidified with oxalic acid (10%) to 5. The pure oxytetracycline base crystallizes. After filtering and washing, the product is dried. Effective yield 87%.

Example 3

The procedure is as in Example 2, but inoculation of the medium is with *Streptomyces rimosus*. 142 hours later, the broth contains 6.3 grams per liter. Final yield 89%.

Example 4

300 liters of a sterile culture medium of the composition:

| | | |
|---|---|---|
| Corn steep liquor (50%) | grams | 28 |
| $CaCO_3$ | do | 12 |
| Starch | do | 38 |
| $NH_4Cl$ | do | 1.5 |
| $MnSO_4 \cdot 4H_2O$ | do | 0.05 |
| $ZnCl_2$ | do | 0.02 |
| $CoCl_2 \cdot 6H_2O$ | do | 0.005 |
| Peanut meal | do | 25 |
| Lard oil | do | 25 |
| Water | milliliters | 1000 |

(pH 6.7 after sterilization)

are inoculated with a spore suspension of *Streptomyces lusitanus* 101–A (CBS) and 1200 milligrams per liter of Δ-DBED divided into four fractions are added to the medium at 0, 36, 72 and 96 hours. The fermentation is performed at 270 C., under stirring and sterile aeration, gradually increasing from 1.5 liters per liter per minute to 4.0 liters per liter per minute. After 150 hours the activity in chlortetracycline is 12.4 grams. The broth is then acidified with sulphuric acid (25%) to pH 0.5 and filtered. Then the pH is raised to 5 with ammonium hydroxide (12%) and 600 grams of Δ-DBED, 1.5 gram per liter of ethylenediamine tetraacetate and 0.3 gram per liter of sodium sulfite added to the filtrate. Upon raising the pH to 8.7, the Δ-DBED complex precipitates. After stirring for 2 hours, the precipitate is filtered, washed with water and well drained. The still wet precipitate is added to 12 liters of dimethylformamide and the complex precipitated by adding 36 liters of water, adjusting the pH to 8.5. The precipitate is filtered off, washed with water until the washing water reaches a neutral pH, and the product dried. There is obtained the Δ-DBED-chlortetracycline complex, containing, according to analysis, 79.5% of chlortetracycline expressed as anhydrous base, 4.89% calcium, 14.8% Δ-DBED and 1.1% water. The "in vitro" antibiotic activity is 863 micrograms per milligram expressed as chlortetracycline hydrochloride. Effective yield 88.1%.

Example 5

300 liters of medium of the formula specified in Example 4 are inoculated with a spore suspension of a demethylchlortetracycline-producing strain of *Streptomyces aurefaciens*. There are added to the medium 100 milligrams per liter at the beginning and 200 milligrams per liter of Δ-DBED after 56 and 112 hours of fermentation. After 130 hours of fermentation, 2.8 grams per liter of demethylchlortetracycline are obtained. To the acidified filtrate 170 grams of Δ-DBED are added, and the further procedure is as in Example 4. The final product has a composition of: 52.8% of demethylchlortetracycline as anhydrous base, 38.4% of Δ-DBED, 6.72% of calcium and 2.43% of water and corresponds to the formula: Demethylchlortetracycline$_2 \cdot$Δ-DBED$_3 \cdot$Ca$_3$ in anhydrous state. Yield 79%.

Example 6

12000 litres of fermented broth containing 11.3 grams per liter of tetracycline are acidified with 25% sulphuric acid until pH 1.5 and filtered with a drum filter. The residue is reslurried in water, the pH being adjusted to 1.5, re-extracted with water and filtered. The united filtrates have a volume of 14800 litres containing 9.1 grams per liter tetracycline (expressed as hydrochloride). Afterwards 1.5 grams per liter of ethylenediamine tetraacetate are added to sequester the calcium ions in excess and 0.8 gram per liter of formaldehyde sodium sulfoxylate as anti-oxidant is added to the acidified and filtered broth. Finally Δ-DBED is added with stirring. Subsequently, the pH is adjusted to 9.5 with 12% ammonia, whereupon the crude Δ-DBED-tetracycline calcium complex precipitates. After stirring for 3 hours, the precipitate is filtered in a filter press and washed with water so as to eliminate most of the ammonia. The wet precipitate is then suspended in an amount of water twice its weight and its pH is adjusted to between 1.5 to 1.6 with a 10% solution of oxalic acid. After stirring for 1 hour, it is filtered and the cake washed twice with water and discharged. 2 grams per liter of formaldehyde sodium sulfoxylate are then added to the filtrate and the pH slowly raised to 7.0 with 10% aqueous sodium hydroxide. The pH is then lowered to 5.0 with concentrated HCl. After stirring for 3 hours at constant pH, the tetracycline base crystallizes, and is centrifuged and washed with water. The base is dried at 65° C. under reduced pressure. The dried base is milled an mixed with twice its weight of 2-isopropoxyethanol containing a stoichiometric amount of concentrated hydrochloric acid. The pH is then adjusted to 1.5. After 24 hours, the thus-formed tetracycline hydrochloride is filtered, washed with butanol and dried at 45° C. The final product assays 988 mcg./mg. Overall yield 76%.

Example 7

300 liters of a sterile culture medium of the composition:

| | | |
|---|---|---|
| Corn steep liquor (50%) | grams | 28 |
| $CaCO_3$ | do | 2.2 |
| Starch | do | 38 |
| $NH_4Cl$ | do | 1.5 |
| $MnSO_4 \cdot 4H_2O$ | do | 0.05 |
| $ZnCl_2$ | do | 0.02 |
| $CoCl_2 \cdot 6H_2O$ | do | 0.005 |
| Peanut meal | do | 25 |
| Lard oil | do | 25 |
| Water | milliliters | 1000 |

$(NH_4)_2CO_3$, quantity necessary to reach pH 6.8.

are inoculated with 1500 cc. of a 24 hours pre-culture of *Streptomyces lusitanus* 101–A (CBS) and 1200 milligrams per liter of Δ-DBED divided into four fractions are added to the medium at 0, 36, 72 and 96 hours. The fermentation is performed at 27° C., under stirring and sterile aeration, gradually increasing from 1.5 liters per liter per minute to 4.0 liters per liter per minute. After 140 hours of fermentation the activity in chlortetracycline is 12.1 grams. The broth is then acidified with sulfuric acid (25%) to pH 0.5 and filtered. Then the pH is raised to 5 with ammonium hydroxide (12%) and 600 grams of Δ-DBED, 1.5 grams per liter of ethylenediamine tetraacetate and 0.3 gram per liter of sodium bisulfite are added to the filtrate. Upon raising the pH to 8.5, the Δ-DBED complex precipitates. After stirring for 2 hours, the precipitate is filtered, washed with water and mixed with 1.2 liter of n-butanol and acidified with hydrochloric acid to pH 0.8 under stirring. The crude chlortetracycline hydrochloride—feed grade quality—crystallizes out, assaying 870 mcg./mg. and weighing 3510 grams.

Having thus disclosed the invention, what is claimed is:

1. In a process for the production of a compound selected from the group chlortetracycline, tetracycline, oxytetracycline and demethylchlortetracycline by aerobic fermentation of an aqueous fermentation medium, containing alkaline earth metal ions, with a tetracycline-producing microorganism of the genus Streptomyces, the improvement which comprises adding to the said medium a small but effective amount of N,N'-dibenzylideneethylenediamine, thereby forming the N,N'-dibenzylideneethylenediamine alkaline earth metal complex of said tetracycline, isolating the said complex, and recovering the free tetracycline base therefrom.

2. The improvement according to claim 1, wherein the N,N'-dibenzylideneethylenediamine is added to said medium during the fermentation.

3. The improvement according to claim 1, wherein the N,N'-dibenzylideneethylenediamine is added to said medium after the fermentation.

4. In a process for the production of a compound selected from the group chlortetracycline, tetracycline, oxytetracycline and demethylchlortetracycline by aerobic fermentation of an aqueous fermentation medium, containing alkaline earth metal ions, with a tetracycline-producing microorganism of the genus Streptomyces, the improvement which comprises adding to the said medium a small but effective amount of N,N'-dibenzylideneethylenediamine portionwise during fermentation, and adding further amount of N,N'-dibenzylideneethylenediamine to the acidified and filtered broth to a final concentration of 0.5 to 1.5 moles per mole of the said antibiotic compound contained in the broth, then precipitating the N,N'-dibenzylideneethylenediamine alkaline earth metal complex of the said tetracycline thus formed at a pH between 8 to 9.5, and recovering the free tetracycline base therefrom.

5. In a process as defined in claim 4, the further step of liberating the free base of the tetracycline compound from the complex by adjusting the pH to 3 to 6 in an aqueous medium.

6. The improvement according to claim 1 wherein the complex is N,N'-dibenzylideneethylenediamine$_3$·Ca$_4$·tetracycline$_8$.

7. The improvement according to claim 1 wherein the complex is demethylchlortetracycline$_2$·N,N'-dibenzylideneethylenediamine$_3$·Ca$_3$.

References Cited

UNITED STATES PATENTS 2,873,276   2/1959   Blase _____ 260—559

FOREIGN PATENTS 111,961   8/1962   Pakistan.

MAURICE W. GREENSTEIN, *Primary Examiner.*